June 14, 1949.  S. I. ZACK  2,473,323
METHOD AND APPARATUS FOR TREATING SEWAGE
Filed May 29, 1945  2 Sheets-Sheet 1

INVENTOR
Samuel I. Zack
BY Norman N. Holland
ATTORNEY

June 14, 1949.  S. I. ZACK  2,473,323
METHOD AND APPARATUS FOR TREATING SEWAGE
Filed May 29, 1945  2 Sheets-Sheet 2
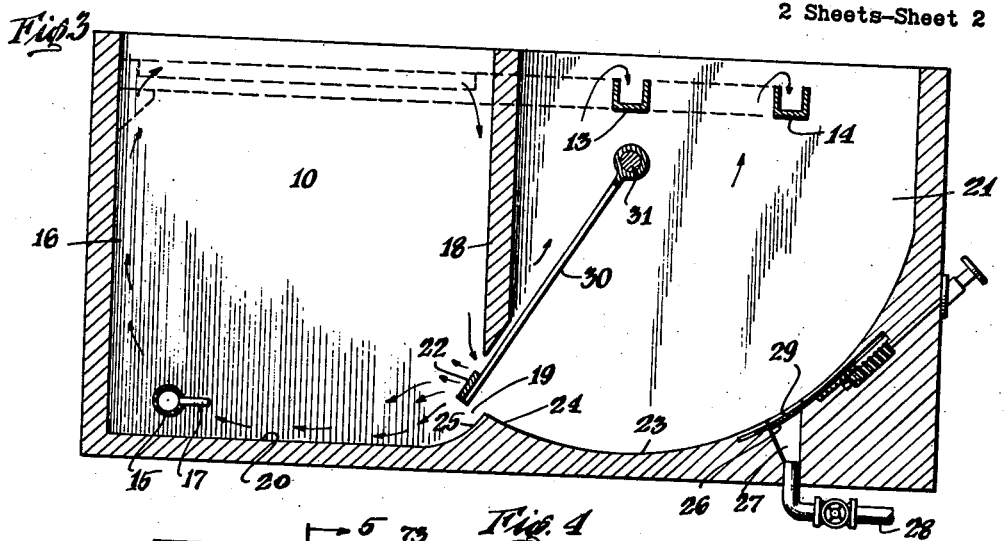
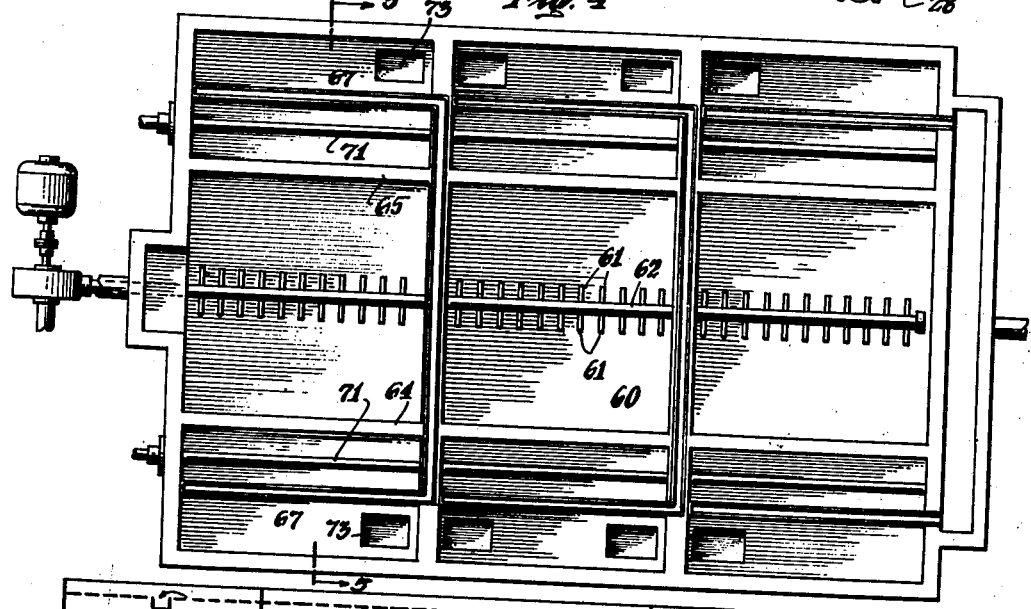
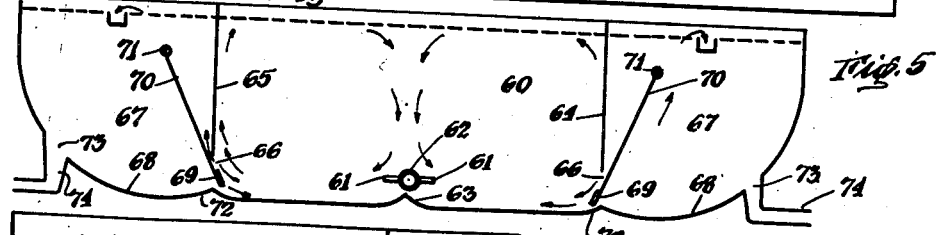
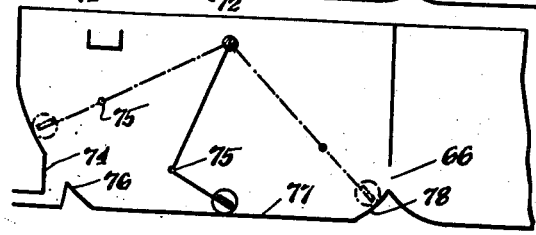
INVENTOR
Samuel I. Zack
BY Norman N. Holland
ATTORNEY Patented June 14, 1949

2,473,323

UNITED STATES PATENT OFFICE 2,473,323

METHOD AND APPARATUS FOR TREATING SEWAGE

Samuel I. Zack, Paxtang, Pa.

Application May 29, 1945, Serial No. 596,469

16 Claims. (Cl. 210—8)

This invention relates to sewage treatment and is herein disclosed in some detail as embodied in a modified activated sludge process and apparatus for carrying it out.

In carrying out the activated sludge process it has been customary to carry through a preliminary settling tank the liquid carrying suspended, colloidal and dissolved solids of organic origin. After remaining a half hour or more in the preliminary settling tank, the sewage has passed into an aeration tank where it usually remained for about six hours, and then the sewage has passed into a final settling tank from which after a two-hours' stay, most of the sewage runs off as a final effluent. Part of the total flow, mostly a sludge fraction, has been returned from the final tank to the aeration tank, so that the sludge in the aeration chamber represented about five to ten days' accumulation of sludge. The remainder of the sludge was permanently withdrawn at the settling tank, so that a feed of raw sewage carrying 200 P. P. M. ended in an effluent of about 20 P. P. M. and a thick sludge.

During the period that it takes for sludge to settle and concentrate in the usual activated sludge process oxygen is being used up and septicity begins when substantially all of the dissolved oxygen has been removed.

To obtain the best results the sludge should be back in the aeration stream before the oxygen is completely exhausted, but that result has proved impossible of attainment.

Moreover, the area occupied by an activated sludge plant has been unduly great; each plant has had to be especially designed and built to fit the amount of sewage to be cared for.

In addition to the foregoing, it is known that about 60% of the purifying has been accomplished in the first hour, and that five hours of further recirculation have been required for the remaining 30% of the purifying. Thus a large mass of sewage is recirculated to obtain the last one-third of the purification. This prolonged treatment has been necessitated by the fact that no intermediate controls have been found possible, and the process operated over substantially identical cycles no matter whether the sewage was strong and required a long period of treatment or was weak and needed a relatively short treatment.

According to the present invention, the foregoing and other objections and difficulties have been overcome, and a structure and process are provided which may treat the sewage in a series of individually controlled steps, easily alterable to provide the best conditions at any given step, separating desired amounts of sludge at each step, and supplying varying amounts of air as needed.

The structure for carrying out these steps is well adapted to be factory built in standard sizes and units, thus reducing costs.

As a result of the ability to vary steps individually to fit varying conditions of operation, it is possible to materially reduce the size of equipment needed and thus save both space and expense.

In addition, no sludge pumps are needed, a single drive may operate all sludge return blades, a speedy and economical return of sludge is effected, and reaeration is simple, effective and economical to prevent septicity in sludge.

Each successive step serves to agglomerate and separate sludge from liquid from which much has already been removed, thus acting successively on smaller increments of impurities. The aeration in each step may be varied to meet the altered state of the sewage treated.

Other features and advantages will hereinafter appear.

In the accompanying drawings:

Fig. 3 is a sectional end view of the structure of Fig. 1, along the line 3—3 of Fig. 1;

Fig. 4 is a plan view of an alternative larger equipment form;

Fig. 5 is a sectional end view along the line 5—5 of Fig. 4; and

Fig. 6 is a diagrammatic sectional view, analogous to Fig. 5, showing an arrangement of settling chamber analogous to Fig. 5 but for still larger equipment.

Figure 1:
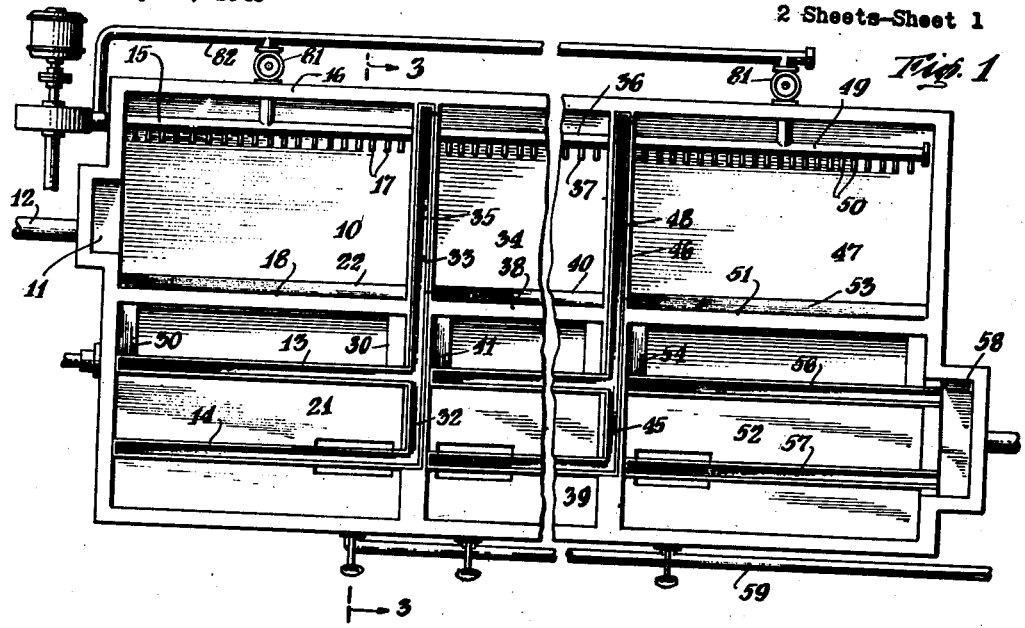
Fig. 1 is a plan view of a typical small plant of the present invention.
Figure 2:
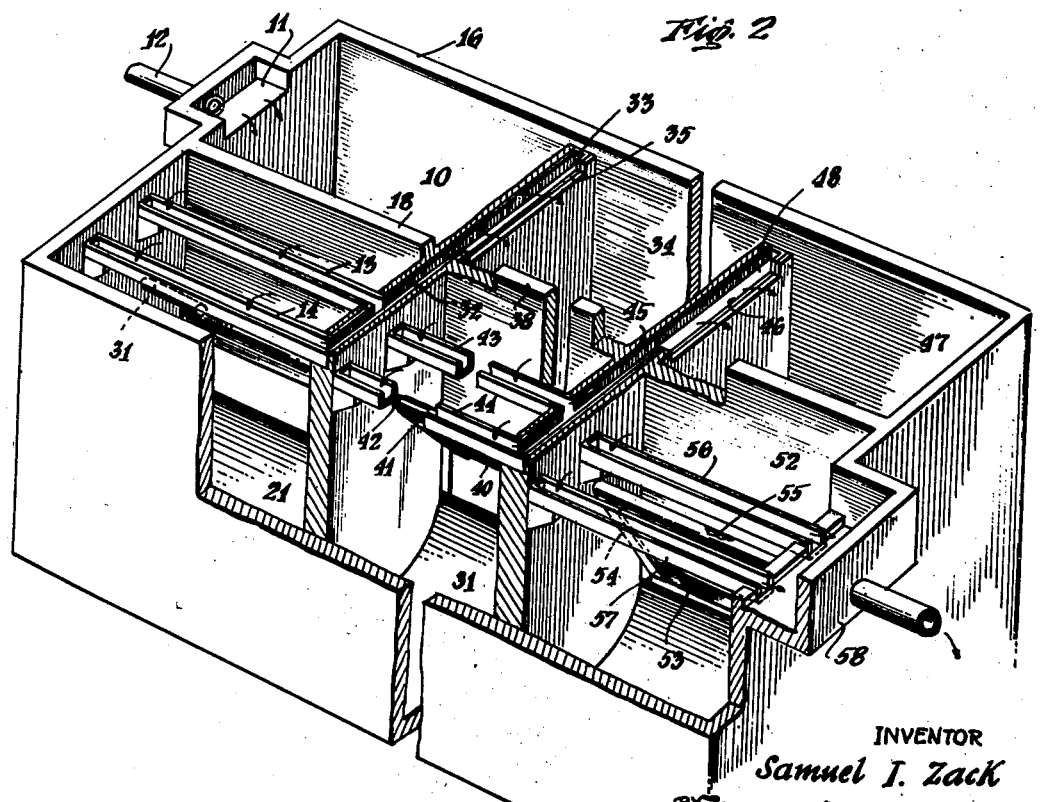
Fig. 2 is a fragmentary perspective of the parts shown in Fig. 1.

In the form of the invention illustrated in some detail in Figs. 1 to 4, untreated sewage or preliminarily settled raw sewage or other liquid is shown as entering an aeration chamber 10 at or near the surface of the contained sewage, flowing in through the broad mouth 11 of a narrower trough or launder 12.

The aeration chamber 10 is shown as approximately rectangular and adapted to hold the sewage that will flow through it in one hour. A suitable chamber for a small plant might be 25 feet long and 15 feet wide and 15 feet deep. Thus the sewage flows very slowly through it so that in one hour usually about 60% of the impurities will settle in a similar settling chamber or, starting with 200 P. P. M. at the intake, a purer liquid will run out through effluent troughs 13 and 14, which are further described below. Here it may be enough to say that the liquid running off through the troughs 13 and 14 will then often carry 80 P. P. M. impurities.

To effect this purifying, the sewage is shown as aerated, by air blown through an air main 15 which runs lengthwise of the chamber 10 near a side wall 16 and is shown provided with a number of projecting spaced porous diffuser tubes 17, so that air bubbles enter into the sewage a little distance from the wall 16 with the result that the rising bubbles of air cause, as viewed in Fig. 3, a slow clockwise current in the sewage. It is possible to introduce the air by mere agitation, but that is usually less efficient except in small installations.

This clockwise current flows down along the opposite wall 18 of the aeration chamber, passing a side opening 19 at the bottom of the wall 18 and then returning along the bottom 20 to pass the main 15.

The opening 19 serves a double purpose, the first purpose being to allow liquid in chamber 10 to pass quietly into the bottom of a settling chamber 21, formed by the common wall 18 and then slowly upward to the surface where the liquid overflows into the spaced effluent troughs 13 and 14 which run longitudinally along the chamber 21 and lie with their tops serving as weirs, just at the liquid surface, to receive and carry off the liquid. To minimize disturbing the liquid in the chamber 21, the effluent troughs are spaced apart about a third or half of the width of the chamber 21 and receive liquid from both sides.

The second purpose of the opening 19 is to admit settled sludge for recirculation before the sludge starts to septify.

To effect this recirculation of sludge, the chamber 21 is shown with a sweeping blade 22 adapted to oscillate across an arcuate portion 23 of the bottom of chamber 21, so that as the blade 22 approaches the opening 19, heaped up sludge in front of it sweeps along a short upcurve 24 of the arc 23 and pushes some or all of the sludge through the opening 19 where it encounters the down current of the chamber 10 along the wall 18, and may tumble down a short slope 25 to the bottom 20. Thus part of the settled sludge is continuously returned at intervals to the chamber 10.

The part to be returned may be adjusted by altering the travel of the blade 22, and it may also be altered by varying the length of the opening 26 which leads to a sludge concentrating pocket 27 and its valved run-off pipe 28. The opening 26 may be a substantial fraction of the length of the chamber 21. The sweeping blade 22 serves to keep sludge from accumulating, sweeps sludge into the removable opening, and, therefore, keeps sludge from becoming septic.

To vary the opening 26 there is diagrammatically shown an adjustable sliding gate 29 adapted to close or partly close the opening 26 at will.

The blade 22 is shown as mounted on arms 30 near its ends and fast to an oscillating shaft 31 driven in any desired manner as by an electric variable speed motor drive so that the blade 22 usually sweeps over the discharge opening 26, not far from the middle of its travel once a minute or possibly once in ten minutes, depending on conditions.

Thus the settling chamber 21 is continually discharging part of the sludge at the opening 26 and returning the rest of the sludge to the aeration chamber 10 to modify the actions taking place there.

As mentioned above, the liquid is believed to be usually best treated when detained in the chamber 10 for about an hour, but the time may be varied widely to suit special operating conditions to meet special needs.

Also as mentioned above, the liquid flows out of the chamber 10 through the chamber 21 and thence by overflowing into the effluent troughs 13 and 14 along their long sides which serve as control weirs.

The effluent runs from the troughs 13 and 14 into a cross-trough 32 shown at the end of the settling chamber 21 which confines the effluent until it reaches a continuation trough 33 which extends the width of a second aeration chamber 34 and which is adapted to let the effluent overflow quietly from its low side 35 along the surface of the liquid in the second aeration chamber 34, which may be built as if partitioned off from chamber 10 or aligned with it.

The second aeration chamber 34 may be identical with the chamber 10, including a continuation 36 of the air main 15, with projecting spaced porous diffuser tubes 37 like the tubes 17, and circulating its contained liquid by rising air bubbles coming from the tubes 37 so the liquid flows across the chamber 34 and down the opposite wall 38, and past a bottom opening in the wall 38.

The opening may be identical with the opening 19, admitting sludge from an adjacent settling chamber 39, the sludge is pushed in by an oscillating blade 40 carried by arms 41 on a continuation 42 of the shaft 31. The chamber 39 may be built as if partitioned off the chamber 21 or aligned with it.

The chamber 34, like the chamber 10, delivers its effluent through its bottom opening to the settling chamber 39 whence it overflows into long surface effluent troughs 43 and 44 like the troughs 13 and 14.

The liquid may remain in the chambers 34 and 39 about the same time as in the chambers 10 and 21, and deposit another 60% of its contained impurities, delivering the sludge in small lots through an opening like the opening 26, and independently adjustable by an adjustable gate to vary the amount of removed sludge in a given time.

The troughs 43 and 44 deliver the liquid effluent into a cross trough 45 which confines the effluent until it reaches a continuation 46 at a third aeration chamber 47, which is adapted to let the effluent overflow quietly from its low side 48 along the surface of the liquid in the third aeration chamber 47.

The third aeration chamber 47 may be identical with the chamber 10, including a continuation 49 of the air main 15, with projecting spaced porous diffusion tubes 50, like the tubes 17 and circulating the contained liquid by rising air bubbles coming from the tubes 50, so the liquid flows across the chamber 47 and down the opposite wall 51, and past a bottom opening in the wall 51.

That opening may be identical with the opening 19, admitting sludge from an adjacent settling chamber 52, which is pushed in by an oscillating blade 53 carried by arms 54 on a continuation 55 of the shaft 31.

The chamber 47, like the chamber 10, delivers its effluent through its bottom opening into the settling chamber 52 whence it overflows into long surface effluent troughs 56 and 57 like the troughs 13 and 14.

The effluent troughs 56 and 57 may deliver the effluent to a fourth aeration and settling chamber, but are shown as delivering to a final effluent run off 58, since apparently 60% of the contained impurities are deposited in settling chamber 47, leaving only a negligible content which can be settled out in any reasonable time.

The settling chambers 39 and 52 may include valved sludge openings or pockets 26 identical with the pocket 26 of chamber 21, and deliver to a sludge pipe 59.

For treating larger amounts of sewage, it may be advisable to operate in larger units such as are diagrammatically shown in Figs. 4 and 5.

In Fig. 4 is shown a form of central aeration chamber 60 receiving sewage which is fed by a suitable trough, not shown, and especially adapted to hold large amounts of sewage, and which may be fifteen to forty feet wide and fifteen feet deep.

In Fig. 4 the aeration is shown as effected by oppositely projecting diffuser pipes 61 projecting horizontally from an air supply pipe 62 located a little above a low central ridge 63 in the chamber floor, so that rising bubbles of air create an upward current in the sewage which tends to flow away from the center of the surface and down along the side walls 64, 65.

In the form shown, the sewage flows out through a bottom opening 66 near the bottom of each wall 64, 65, into each side settling chamber 67 in which settles sludge.

Each chamber 67 is shown as having an arcuate outer bottom and side 68 across which sweeps a sludge blade 69 carried by arms 70 fixed to an oscillating shaft 71 journalled at the center of the arc 68.

The blades 69 sweep into and out of the openings 66 to sweep back into the aeration chamber 60 a proper amount of sludge to effect the desired reactions, sweeping up over short up curves 72 below the openings 66, and also sweeping over suitable openings 73 into sludge pockets 74 so that valves (not shown) may control the amount of sludge drawn off.

If the settling chambers become too large for a suitable arc 68, for arms 70, it may be advantageous to modify the arms 70 by hinging them (Fig. 6) at 75 so they may sweep over an effective arc 76 with its sludge pocket 74, and then the blades may be carried by the bent arms along a flat stretch 77 of the bottom, and later, with the arms straightened, over a rising arc 78 to the opening 66.

It seems likely that the device of Fig. 1 will care for a typical population of 5,000 to 7,500, say 0.5 m. g. d. to 0.75 m. g. d., and that larger units will care for larger volumes of sewage without need of duplicating equipment until about 10 m. g. d. is to be cared for.

Where variation in air supply for the different units is desired, the air main may be outside the chambers 10, 34 and 47 as shown at 82, (Fig. 1), and be connected by independently operable valved extensions 81 to the chambers and to interiorly disposed extensions 15, 36 and 49.

As various changes may be made in the form, construction and arrangement of the parts herein without departing from the spirit and scope of the invention and without sacrificing any of its advantages, it is to be understood that all descriptive matter herein is to be interpreted as illustrative and not in a limiting sense, for it is intended that the patent shall cover by the claims whatever features of patentable novelty exist in the invention disclosed.

Having thus described certain embodiments of the invention in some detail, what is claimed is:

1. In a sewage treatment apparatus, the combination with an aeration chamber to receive sewage and means for introducing sewage thereinto, of an adjacent settling chamber receiving sewage therefrom through a bottom opening between the chambers, a device adapted to be operated from the exterior of settling chamber for returning part of the settled sludge from the settling chamber to the aeration chamber through said bottom opening between the chambers, a separately settable device through which excess sludge is removed, an effluent connection from the settling chamber including troughs serving as weirs substantially throughout the length of the chamber and drawing liquid through the bottom opening, and an elongate aerating device in the aeration chamber adjacent a bottom wall thereof adapted to maintain circulation of sewage in the aeration chamber by supplying air thereto.

2. In a sewage treatment apparatus, the combination with an aeration chamber to receive sewage and means for introducing sewage into said chamber, of an adjacent settling chamber receiving sewage therefrom through a bottom opening between the chambers, a device adapted to be operated by means disposed outside the settling tank for returning part of the settled sludge from the settling chamber to the aeration chamber through said bottom opening between the chambers, a separately settable device through which excess sludge is removed, an effluent connection from the settling chamber including troughs serving as weirs substantially throughout the length of the chamber and drawing liquid through the opening, and an aerating device in the aeration chamber adjacent and extending along the wall away from the opening and adjacent the lower part of said aeration chamber adapted to maintain circulation of sewage in the aeration chamber by supplying air thereto.

3. In a sewage treatment apparatus, the combination with an aeration chamber to receive sewage and means for introducing sewage thereinto, of an adjacent settling chamber receiving the aerated sewage through a bottom opening between the chambers, a device operable by drive means for returning part of the settled sludge from the settling chamber to the aeration chamber through the bottom opening between the chambers, a separately settable device through which excess sludge is removed, an effluent connection from the settling chamber including troughs serving as weirs substantially throughout the length of the chamber and drawing liquid through the opening, and an aerating device including an air supply pipe and porous air delivery means extending substantially entirely across the aeration chamber adjacent the wall away from the opening and adapted to maintain circulation of sewage in the chamber upon supply of air thereto.

4. In a sewage treatment apparatus, the combination with an aeration chamber to receive sewage and sewage introducing means, of an adjacent settling chamber having one wall in common with the aeration chamber and including an opening near the bottom of the wall forming the effluent means for the aeration chamber, an aeration device adjacent a lower wall of the aeration chamber carrying air into the sewage in the aeration chamber, a swinging blade operable in response to exteriorly disposed drive means removing sludge from the floor of the settling chamber and returning part of it through said opening to the aeration chamber and also sweeping part of the sludge away from the flowing sewage through a floor opening in the settling chamber, and an effluent weir adjacent an upper part of the settling chamber.

5. In a sewage treatment apparatus, the combination with an aeration chamber to receive sewage and sewage introducing means, of an adjacent settling chamber having one wall in common with the aeration chamber and including an opening near the bottom of the wall forming the effluent means for the aeration chamber, an aeration device carrying air into the sewage adjacent the opposite wall and lower part of the aeration chamber and including an air supply pipe and porous air delivery element, a swinging blade movable substantially against said common wall adjacent said bottom opening for removing sludge from the floor of the settling chamber and returning part of it through said opening to the aeration chamber and also sweeping part of the sludge away from the flowing sewage through a floor opening in the settling chamber, a drive shaft connected with and movable to actuate said blade, and an effluent weir at an upper part of the settling chamber.

6. The combination with an aeration chamber adapted to receive sewage and means for introducing sewage thereinto, of a settling chamber separated from said aeration chamber by a wall having a bottom opening, an effluent weir spaced above the bottom of the settling chamber drawing sewage through the opening, a swinging blade in the settling chamber returning settled sludge to the aeration chamber through the opening and also removing sludge away from the flowing sewage through a bottom opening, an air introducing device in the aeration chamber along a wall facing the wall opening, a second aeration chamber substantially aligned with the first aeration chamber, a second settling chamber substantially aligned with the first settling chamber, a trough adapted to feed effluent from said first settling chamber to the second aeration chamber, a wall separating the second aeration chamber from the second settling chamber and having an effluent opening for the second aeration chamber, an air introducing device in the second aeration chamber along a wall facing the wall opening, a second swinging blade in the second settling chamber returning settled sludge to the second aeration chamber through the opening and also removing sludge away from the flowing sewage through a bottom opening, means adapted to actuate said swinging blades, and an effluent device for the second settling chamber.

7. The combination with a series of aeration chambers having walls and means for introducing sewage to an aeration chamber, of a series of aeration devices adapted to circulate sewage in the chamber, a series of settling chambers beyond one set of walls and communicating with the aeration chambers by bottom openings in the walls, curved bottoms for the settling chambers having discharge openings for sludge, blades adapted for sweeping across said bottoms and partially into said wall openings to remove sludge partly through said wall openings for returning sludge to aeration and partly through said bottom openings for removing sludge from the body of flowing sewage, movable means connected with said blades for actuation thereof, and means for conducting effluent away from the settling chambers.

8. The combination with a series of aeration chambers having walls and means for introducing sewage, of a series of aeration devices adapted to circulate sewage in the chamber, a series of settling chambers beyond one set of walls and connected with the aeration chambers by bottom openings in the walls, curved bottoms for the settling chambers having discharge openings for sludge for removing sludge from the body of flowing sewage, devices for varying the size of the discharge openings, blades adapted for sweeping movement across said bottoms and partially through said bottom openings in the walls to remove sludge partly through said wall openings for returning sludge to aeration and partly through said bottom openings in a ratio determined by the size of the openings, and a movable means connected with said blades for actuation thereof.

9. The process of treating sewage which includes introducing sewage into and circulating it and aerating it in an aeration chamber, withdrawing the sewage from its bottom, settling sludge out of the sewage in a separate adjacent settling chamber, returning part of the sludge to the aeration chamber, separating out at the bottom and removing from the body of flowing seawage the rest of the settled sludge, overflowing the effluent at the top into a second aeration chamber, withdrawing the sewage from its bottom, settling further sludge out of the sewage in a separate adjacent settling chamber, returning part of the sludge to the second aeration chamber, separating out at the bottom and removing from the body of flowing sewage the rest of the settled sludge, and overflowing the effluent at the top.

10. The process which includes aerating incoming sewage, flowing aerated sewage through an opening and settling part of the sludge out of the aerated sewage, returning part of the settled sludge to the incoming sewage and momentarily blocking the major portion of said opening, discharging from the body of flowing sewage the rest of the settled sludge by gravity at the bottom, separately reaerating the remainder of the sewage, settling a separately controlled further amount of sludge from said remainder, returning part of the residual settled sludge to the reaerated remainder, discharging from the body of flowing sewage the rest of the settled sludge by gravity at the bottom, and overflowing the effluent from it.

11. The process which includes aerating incoming sewage in a tank so as to keep it circulating, slowly removing sewage from the aeration tank by withdrawal from the lower part thereof and settling part of the sludge from said removed sewage in a separate settling tank, returning part of the settled sludge to the incoming sewage in the aeration tank at the lower part thereof, discharging by gravity at the bottom of the settling tank the rest of the settled sludge, overflowing the remainder of the sewage, reaerating said remainder of the sewage in a second aeration tank, removing said sewage remainder from said second aeration tank by withdrawal from the lower part thereof and settling a separately controlled part of the sludge from it in a second settling tank, returning a portion of the settled part to said remainder in said second aeration tank, at the lower part thereof for reaerating it, discharging by gravity at the bottom of the second settling tank the rest of said settled part of the sludge, overflowing the remainder of the sewage from the second settling tank and reaerating it a third time in a third aeration tank, removing sewage from said third aeration tank by withdrawal from the lower part thereof, settling sludge in a third settling tank, returning to said third reaerating tank at the lower part thereof a separately controlled part of the last settled sludge, discharging by gravity at the bottom of the third settling tank the rest of the last settled sludge, and separately discharging the remaining sewage.

12. The process of purifying sewage which includes aerating it, mechanically removing part of the sludge, mechanically returning part of the removed sludge, discharging from the body of flowing sewage by gravity the remainder of the removed sludge, reaerating the sewage from which said part has been removed, mechanically removing more sludge, mechanically returning a separately controlled part of said latter mentioned removed sludge to the sewage being reaerated, discharging by gravity from the body of flowing sewage the remainder of the removed sludge, and carrying off the sewage from which the sludge has been removed.

13. The process of purifying sewage which includes aerating it, flowing aerated sewage through an opening and settling sludge from said aerated sewage to include the major part which can be settled before contained oxygen is exhausted, separating part of the settled sludge and returning it to the oncoming sewage for further aeration and momentarily reversing the direction of sewage flow through said opening during said sludge separating, separately removing the remainder of the settled sludge from the body of flowing sewage, separately reaerating the remainder of the sewage, settling further sludge, returning part of the settled further sludge for said reaeration, separately discharging the remainder of the sludge from the body of flowing sewage, and separately discharging the rest of the sewage.

14. The combination with an aeration chamber having a side wall and sewage introducing means, of a settling chamber having a bottom of which a major part is flat and extends to a location adjacent an opening through said side wall, said bottom also including an exit opening for discharging sewage from the body of flowing sewage, an aerating device in the aeration chamber, an effluent weir in the settling chamber drawing sewage from the aeration chamber through the opening of said side wall, an oscillatable shaft, an articulated support rod operatively connected with said shaft, and a swinging scraping device carried by said rod for returning part of the settled sludge to the aeration chamber through the side wall opening and delivering a separate part through the exit opening.

15. The combination with a series of aeration chambers having side walls and sewage introducing means associated with one of said chambers, of a separate settling chamber for each aeration chamber and connected therewith by a bottom opening, a swinging scraper in each settling chamber adapted to deliver part of the settlings to a separate discharge bottom opening having a lesser length than that of its settling chamber and adapted to return part of the settlings through the connecting opening to the aeration chamber, means adapted to conduct effluent away from each settling chamber, a pair of arms carrying each scraper, a movable shaft supporting said arms and a single drive connected with said shaft for actuation thereof.

16. In a sewage treatment device, an aeration chamber, means for introducing sewage into said chamber, a settling chamber provided with a partly arcuate bottom and having a relatively wide opening communicating with the aeration chamber adjacent one edge of the bottom and having a sludge exit opening in the arcuate bottom extending across a relatively narrow portion of the width of said settling chamber, a sludge scraper movable over the bottom to deliver part of the sludge through the sludge exit opening and movable substantially against an edge portion of said relatively wide opening adapted to push sludge through the latter opening into the aeration chamber, and a trough adapted to carry off from the settling chamber effluent from which sludge has settled.

SAMUEL I. ZACK.

REFERENCES CITED

The following references are of record in the file of this patent:

UNITED STATES PATENTS

| Number | Name | Date |
|---|---|---|
| 1,123,011 | Ripley | Dec. 29, 1914 |
| 1,139,024 | Frank | May 11, 1915 |
| 1,717,780 | Imhoff | June 18, 1929 |
| 1,738,362 | Downes | Dec. 3, 1929 |
| 1,820,977 | Imhoff | Sept. 1, 1931 |
| 1,982,246 | Fischer | Nov. 27, 1934 |
| 1,985,854 | Downes | Dec. 25, 1934 |
| 1,994,887 | Downes et al. | Mar. 19, 1935 |
| 2,024,345 | Elrod | Dec. 17, 1935 |
| 2,027,370 | Currie | Jan. 14, 1936 |
| 2,048,640 | Sperry | July 21, 1936 |
| 2,089,160 | Darby | Aug. 3, 1937 |
| 2,090,384 | Durdin 3d | Aug. 17, 1937 |
| 2,160,838 | Dorr | June 6, 1939 |
| 2,168,208 | Jenks | Aug. 1, 1939 |
| 2,225,437 | Nordell | Dec. 17, 1940 |
| 2,258,398 | Ward | Oct. 7, 1941 |
| 2,381,579 | Durdin 3d | Aug. 7, 1945 |
| 2,394,413 | Walker | Feb. 5, 1946 |

FOREIGN PATENTS

| Number | Country | Date |
|---|---|---|
| 27,240 | Great Britain | 1905 |
| 466,743 | Germany | Oct. 12, 1928 |

OTHER REFERENCES

"Sewage Works Journal," vol. 2, No. 4, October 1930, p. 544.